US010718089B2

(12) United States Patent
Jurisch et al.

(10) Patent No.: US 10,718,089 B2
(45) Date of Patent: Jul. 21, 2020

(54) CF PAPER

(71) Applicant: PAPIERFABRIK AUGUST KOEHLER SE, Oberkirch (DE)

(72) Inventors: Claus Jurisch, Offenburg (DE); Lutz Kuhne, Ohlsbach (DE)

(73) Assignee: PAPIERFABRIK AUGUST KOEHLER SE, Oberkirch (DE)

( * ) Notice: Subject to any disclaimer, the term of this patent is extended or adjusted under 35 U.S.C. 154(b) by 0 days.

(21) Appl. No.: 15/317,239

(22) PCT Filed: Jun. 10, 2015

(86) PCT No.: PCT/EP2015/062874
§ 371 (c)(1),
(2) Date: Dec. 8, 2016

(87) PCT Pub. No.: WO2015/189231
PCT Pub. Date: Dec. 17, 2015

(65) Prior Publication Data
US 2017/0114502 A1 Apr. 27, 2017

(30) Foreign Application Priority Data
Jun. 13, 2014 (DE) ........................ 10 2014 108 341

(51) Int. Cl.

| | |
|---|---|
| ***D21H 19/54*** | (2006.01) |
| ***D21H 23/40*** | (2006.01) |
| ***D21H 19/44*** | (2006.01) |
| ***D21H 23/32*** | (2006.01) |
| ***D21H 19/52*** | (2006.01) |
| ***D21H 19/00*** | (2006.01) |
| ***C08B 30/12*** | (2006.01) |
| ***C08L 3/04*** | (2006.01) |
| ***C08B 31/00*** | (2006.01) |
| ***D21H 19/38*** | (2006.01) |
| ***D21H 19/46*** | (2006.01) |
| ***D21H 19/56*** | (2006.01) |
| ***D21H 19/58*** | (2006.01) |
| *B41M 5/155* | (2006.01) |

(52) U.S. Cl.
CPC ............. *D21H 19/54* (2013.01); *C08B 30/12* (2013.01); *C08B 31/003* (2013.01); *C08L 3/04* (2013.01); *D21H 19/00* (2013.01); *D21H 19/385* (2013.01); *D21H 19/44* (2013.01); *D21H 19/46* (2013.01); *D21H 19/52* (2013.01); *D21H 19/56* (2013.01); *D21H 19/58* (2013.01); *D21H 23/32* (2013.01); *D21H 23/40* (2013.01); *B41M 5/155* (2013.01); *B41M 5/1555* (2013.01); *Y10T 428/2985* (2015.01)

(58) Field of Classification Search
CPC ..... B41M 5/155; B41M 5/1555; D21H 19/54; C08B 30/12; C08B 31/003; C08L 3/04; Y10T 428/2985
USPC .................................................. 503/207, 212
See application file for complete search history.

(56) References Cited

U.S. PATENT DOCUMENTS

| | | | | |
|---|---|---|---|---|
| 2,730,456 | A | 1/1956 | Green et al. | |
| 3,732,120 | A | 5/1973 | Brockett et al. | |
| 3,737,410 | A | 6/1973 | Mueller | |
| 3,924,027 | A | 12/1975 | Saito et al. | |
| 4,188,456 | A | 2/1980 | Patel | |
| 4,374,671 | A | 2/1983 | Hayashi et al. | |
| 5,084,492 | A * | 1/1992 | Pinell | B41M 5/155 106/31.18 |
| 5,382,560 | A * | 1/1995 | Hisada | B41M 5/155 106/31.18 |
| 6,677,386 | B1 * | 1/2004 | Giezen | C08B 30/12 106/206.1 |
| 8,183,175 | B2 | 5/2012 | Masuda | |
| 2010/0048394 | A1 | 2/2010 | Horn et al. | |
| 2017/0114502 | A1 * | 4/2017 | Jurisch | D21H 19/00 |

FOREIGN PATENT DOCUMENTS

| | | | |
|---|---|---|---|
| DE | 1275550 | | 8/1968 |
| DE | 2147585 | | 4/1972 |
| DE | 2228431 | | 12/1972 |
| DE | 2854318 | C2 | 7/1979 |
| DE | 69032990 | T2 | 10/1999 |
| DE | 60005932 | T2 | 8/2004 |
| DE | 112007002203 | T5 | 7/2009 |
| EP | 0428994 | B1 | 5/1991 |
| EP | 0657300 | B1 | 6/1995 |
| EP | 0470516 | B1 | 3/1996 |
| EP | 1176255 | A1 | 1/2002 |
| EP | 2251484 | A1 | 11/2010 |
| EP | 2546066 | A1 | 1/2013 |
| GB | 2028888 | | 3/1980 |
| WO | 2008006474 | A1 | 1/2008 |
| WO | 2008022127 | A2 | 2/2008 |
| WO | 2010065750 | A1 | 6/2010 |
| WO | 2011084692 | A1 | 7/2011 |

OTHER PUBLICATIONS

Blombergen et al., Paper Binder Performance With Biobased Nanoparticles. In Paper 360, Sep. 2008, 46-48.

* cited by examiner

*Primary Examiner* — Betelhem Shewareged
(74) *Attorney, Agent, or Firm* — Fay Sharpe LLP

(57) ABSTRACT

The invention concerns a CF paper comprising a base paper and a coating applied thereto, said coating containing at least one binding agent, at least one ink-absorbing agent, at least one coating pigment and conventional additives, and being characterised in that the at least one binding agent comprises a cross-linked biopolymeric material in the form of nanoparticles.

20 Claims, No Drawings

CF PAPER

The invention relates to a coated paper (coated front=CF), that is a CF paper. The invention also relates to the use of a CF paper.

Carbonless copy papers are used to produce copies, for example for invoices, forms, contracts, etc. The copy is created by a chemical reaction between a colour former and a developer. The principle is therefore based on producing a copy by a chemical reaction being caused between two complementary layers as a result of the pressure exerted on the paper generated by a writing utensil, a computer printer, a typewriter, etc. The first, transferring layer—the CB layer (coated back)—contains microcapsules which contain a colour-forming substance dissolved in an organic solvent having a high boiling point. When mechanical pressure is applied to the microcapsules, said microcapsules burst and release the colour former, which is absorbed by the second, receiving layer—the CF layer (coated front). This CF layer contains the developer, which reacts with the colour former and creates a carbon copy.

It is possible to differentiate between three functional papers within carbonless copy papers: CB papers contain a transferring coating on the rear side, which coating contains the microcapsules filled with the colour former. This CB paper is used as the uppermost sheet of sets of forms.

In CFB papers, the developer is on the front side. The colour former stored in the microcapsules is on the rear side. CFB paper is used for the middle sheet or for one of several middle sheets of sets of forms. Said paper is the central constituent of the set and receives and reproduces the copy.

CF papers are used as the last sheet of sets of forms. The front side contains the developer. The rear side is not coated with microcapsules.

SC (self-contained) papers are an exception. In these, colour-generating agents and developers are on the same sheet in the same layer on the front side of the paper.

U.S. Pat. No. 2,730,456 A describes the functionality of carbonless copy papers, in which the microcapsules applied to the rear side of a sheet of paper (coated back=CB) burst as a result of writing on the front side of the paper and release the colour-generating agent dissolved in an oil, which agent is then transferred, by means of the transporting oil, to the underlying sheet of paper that is coated with a developer (coated front=CF). The carbon copy is produced as a result of the reaction between the colour-generating agent and the developer. U.S. Pat. No. 2,730,457 A discloses the above-mentioned exception, in which both microcapsules containing colour-generating agent and the developer are located in the upper coating layer of a self-contained (SC) paper, as a result of which a carbon copy is produced, even when writing on a conventional sheet of paper placed on top of said SC paper.

The developer components and the additional common coating constituents are fused by binders. Acidic clay minerals, for example acid-activated bentonite or synthetic sodium aluminosilicate (see U.S. Pat. No. 2,730,456 A); zinc-doped phenolic resins (see DE 1 275 550 B, DE 2 228 431 A1, U.S. Pat. No. 3,737,410 A, DE 2 854 318 A1 and GB 2 028 888 A), zinc salts of salicylic acid derivatives (simply referred to as zinc salicylate derivatives; see DE 2 147 585 A1, U.S. Pat. No. 3,924,027 A, EP 0 470 516 A2 and EP 0 657 300 A1) or mixtures thereof are mainly used as the developer components nowadays. Native or modified starches, polyvinyl alcohol or synthetic binders, such as styrene-butadiene latices (SB latices) and styrene-acrylate latices (SA latices) are typically used as the binder. On the one hand, the binder must ensure that all the coating constituents are sufficiently securely fused, even during the additional processing steps and during normal use of the paper, including printing, by means of different printing methods. On the other hand, the binder has to be selected such that there is as little impact as possible on the function of the carbonless copy paper, i.e. the carbon copying performance. A combination of the above-mentioned organic colour-developing agents (zinc-doped phenolic resin and/or zinc salts of salicylic acid derivatives) with precipitated calcium carbonate having a high oil absorption value has proven to be particularly advantageous for effective carbon copying performance. Combinations of SB latex and soluble modified starch or native starch that is dissolved by means of heating are used as the binder (see EP 0 657 300 A1).

The known pressure-sensitive recording materials have, however, displayed various disadvantages; in particular, on account of the introduction of modern, faster offset printing, most particularly in UV-curing offset printing, errors occurred in form printers when printing on CF papers such that there was a build-up of ink on the rubber blankets of the printing units. This led to increased cleaning effort and lower productivity. Attempts have in fact been made to solve this problem by changing the binder or binder system in the CF paper. Instead of a mixture of SB latex and modified starch, an attempt was made to dispense with the starch and increase the proportion of SB latex. This was supposed to ensure sufficient coating binding, since soluble starches and other polymer solutions generally form dense films in contrast to polymer dispersions (such as SB latex). Although this measure was able to improve the printability, a noticeable loss of carbon copying performance had to be taken into account. This in turn had to be compensated for by increasing the proportion of organic colour developing agent, which is unfavourable from a commercial point of view.

The object of the present invention is therefore to provide a CF paper which overcomes the disadvantages of known CF papers. In particular, a CF paper which has good carbon copying performance without negatively influencing the other requirements placed on a CF paper, such as printability, proportion of organic colour developing agent, etc. shall be provided. It would also be desirable for the use of the CF paper not to lead to any problems in offset printing or in UV-curing offset printing, in particular any build-up of ink on the rubber blanket.

This object is achieved according to the invention by a CF paper according to claim 1, according to which said paper comprises a base paper and a coating applied thereto, which coating contains at least one binder, at least one developer, at least one coating pigment and common additives, characterised in that the at least one binder comprises a crosslinked biopolymer material in the form of nanoparticles.

The core of the invention is therefore that the coating applied to the base paper contains a crosslinked biopolymer material in the form of nanoparticles as the binder.

A material of this type is known for example from U.S. Pat. No. 6,677,386 A and WO 2008/022127 A2. Reference is made in full here to these documents with regard to the crosslinked biopolymer material in the form of nanoparticles.

The crosslinked biopolymer material in the form of nanoparticles is preferably produced according to the method described in U.S. Pat. No. 6,677,386 A, in which a biopolymer material, such as starch, containing amylose and amylopectin or both, is mixed with a plasticising agent.

This mixture is mixed by the application of strong shear forces, causing the biopolymer material to plasticise and a thermoplastic melt phase to form, preferably in a fully intermeshing, co-rotating twin screw extruder, as a result of which the crystalline structure of the biopolymer material is lost. In order to crosslink the nanoparticles, a crosslinking agent is added during the mixing process. The nanoparticles leave the extruder as a strand that is ground to form a fine powder. The nanoparticles are agglomerated in the powder and can be dispersed in an aqueous medium.

The biopolymer material can be starch or other polysaccharides, such as cellulose and natural gums, and proteins (e.g. gelatine, whey protein). The biopolymer material can be pre-modified, e.g. by means of cationic groups, carboxymethyl groups, by acylation, phosphorylation, hydroxyalkylation, oxidation or the like. Starches, starch derivatives and mixtures of other polymers containing at least 50% starch are preferred. The starch, either as an individual component or in a mixture with other polymers, and the starch derivatives preferably have a molecular weight of at least 10,000 g/mol, and are not dextran or dextrin. Waxy starches, such as waxy corn starch, are particularly preferable.

The biopolymer material preferably has a dry weight of at least approximately 50 wt. % at the start of the method. The method is preferably carried out at at least approximately 40° C., i.e. below the decomposition temperature of the biopolymer material, for example at approximately 200° C.

The shear forces can be such that 100 J of specific mechanical energy act per gram of biopolymer material. Depending on the apparatus used, the minimum amount of energy can be higher; even when non-gelatinised material is used, the amount of specific mechanical energy can be higher, e.g. at least approximately 250 J/g, preferably at least approximately 500 J/g.

The plasticising agent can be water or a polyol (for example ethylene glycol, propylene glycol, polyglycols, glycerol, sugar alcohols, urea, citric acid esters, etc.). The overall amount of plasticising agent is preferably between approximately 15 and 50%. A lubricant, such as lecithin, other phospholipids or monoglycerides can be added if desired, for example in an amount of from approximately 0.5 to 2.5 wt. %. An acid, preferably a solid or semisolid organic acid, such an maleic acid, citric acid, oxalic acid, lactic acid, gluconic acid or an enzyme, such as amylase, that breaks down carbohydrates can be present in an amount of from approximately 0.01 to 5 wt. %, based on the biopolymer material. The acid or the enzyme help with slight depolymerisation, which is advantageous when producing nanoparticles having a defined size.

The crosslinking process is preferably reversible, it being possible for this to be reversed either in part or completely following mechanical processing. Suitable reversible crosslinking agents preferably include those that form chemical bonds at a low water concentration and re-dissociate or hydrolyse in the presence of a higher water concentration. This type of crosslinking leads to a temporarily high viscosity during the method, followed by a lower viscosity at the end of the method.

Examples of reversible crosslinking agents are dialdehydes and polyaldehydes, acid anhydrides and mixed anhydrides and the like (for example succinate and acetic anhydride). Suitable dialdehydes and polyaldehydes are glutaraldehydes, glyoxal, periodate-oxidised hydrocarbons and the like. Glyoxal is a particularly suitable crosslinking agent.

The crosslinking agents can be used either on their own or as a mixture of reversible and non-reversible crosslinking agents. Conventional crosslinking agents, such as epichlorohydrin and other epoxides, triphosphates and divinyl sulfone can be used as the non-reversible crosslinking agent for polysaccharide-based biopolymer material. Dialdehydes, thiol reagents and the like can be used for protein-based biopolymers. Crosslinking can be acid- or base-catalysed.

The amount of crosslinking agent can be between approximately 0.1 and 10 wt. %, in relation to the biopolymer material. The crosslinking agent can already be present at the beginning of the mechanical reaction, but in the case of a biopolymer material that has not been gelatinised beforehand, such as granular starch, it is preferable for the crosslinking agent to be added later on, for example during mechanical reaction.

The mechanically treated, crosslinked biopolymer material is then preferably made into a latex by being dispersed in a suitable solvent, usually water and/or another hydroxylic solvent, for example alcohol, at a concentration of between approximately 4 and 50 wt. %, particularly preferably between approximately 10 and 40 wt. %.

Prior to dispersion, a cryogenic grinding process can be carried out, but stirring at a slightly higher temperature can also be expedient. This processing creates a gel, which assumes the form of a latex either spontaneously or following induction by means of water adsorption. This viscosity behaviour can be utilised for the application of the particles, for example improved mixing behaviour. If desired, the dispersed biopolymer material can be crosslinked further, using the same or other crosslinking agents.

The extruded product is characterised in that it swells up in an aqueous solvent, for example in water or in a mixture containing at least approximately 50% water together with a solvent, such as an alcohol, that is miscible in water, and forms a dispersion of nanoparticles after a fall in viscosity.

For the crosslinked biopolymer material in the form of nanoparticles, conjugates thereof can also be used. These are the above-described crosslinked biopolymer material in the form of nanoparticles that are chemically or physically bound to an additional additive. For example, titanium dioxide, aluminium oxide, aluminium trihydrate, sodium aluminium phosphate, aluminium phosphate, sodium aluminium magnesium silicate, fly ash, zeolites, sodium aluminosilicate, tallow clay minerals, delaminated alumina, calcined kaolin alumina, montmorillonite alumina, nano alumina, silica particles, zinc oxide, calcium carbonate, optical brighteners, biocides, stabilisers, etc. and combinations thereof are possible additives. Conjugates of this type are described for example in WO 2010/065750 A1.

In a preferred embodiment, the crosslinked biopolymer material in the form of nanoparticles is obtainable by means of a method in which a biopolymer material is plasticised by using shear forces and in the presence of a crosslinking agent and optionally subsequently dispersed in a hydroxylic solvent, preferably water.

The crosslinked biopolymer material in the form of nanoparticles, which is used as a binder in the coating of the CF paper according to the invention, is also known from WO 2011/084692 A1, EP 2 251 484 A1 and EP 1 176 255 A1. Reference is also made in full here to these documents with regard to the biopolymer material in the form of nanoparticles that is used.

In a preferred embodiment, the crosslinked biopolymer material in the form of nanoparticles has a degree of swelling of less than 2, preferably less than 1. The degree of swelling was determined as described in DE 11 2007 002 203 T5:

The degree of swelling relates to an expansion in volume when the crosslinked biopolymer material in the form of nanoparticles swells in water. For this purpose, a sample of an anhydrous amount of 2 g is added to 200 ml of pure water, dispersed therein and heated directly thereafter in a fully boiling water bath for 30 minutes and cooled to room temperature. The water that has been evaporated is added and the sample is dispersed once again and 100 ml of the dispersion is accurately added to a measuring cylinder. The measuring cylinder is left to stand for 24 hours at room temperature and the amount (ml) of a precipitate is visually measured, and this value is taken as the degree of swelling.

In a preferred embodiment, the crosslinked biopolymer material in the form of nanoparticles is starch, a starch derivative or a polymer mixture comprising at least approximately 50 wt. % starch or starch derivative, starch and starch derivatives being particularly preferred. Most preferable is starch, in particular a crosslinked starch, which has not been modified in any other way.

The average particle size of the biopolymer material in the form of nanoparticles used is preferably between approximately 10 nm and 1000 nm, particularly preferably between approximately 40 nm and 500 nm, and most preferably between approximately 40 nm and 200 nm.

Ecosphere 2240 Biolatex Binder, Ecosphere 92240, 92273, X282 Biolatex Binder and Ecosphere 2202 (all obtainable from EcoSynthetix Inc.) can be used for example as the crosslinked biopolymer material.

In a preferred embodiment, the crosslinked biopolymer material in the form of nanoparticles is used in an amount of from 5 to 30 wt. %, preferably in an amount of from 7 to 25 wt. %, and particularly preferably in an amount of from 15 to 22 wt. %, based on the overall weight of the coating.

Too high amounts are disadvantageous in that the carbon copying performance falls, while too low amounts leads to a reduction in the binding force.

In another preferred embodiment, the coating applied to the CF paper contains an additional binder. An additional binder is understood to be a binder that is present in the coating in addition to the crosslinked biopolymer material in the form of nanoparticles. This means that, in the CF paper according to the invention, one or more common binders can be replaced either fully or in part by a crosslinked biopolymer material in the form of nanoparticles.

The selection of the additional binder is not critical. For example, water-soluble starches, starch derivatives, hydroxyethyl cellulose, polyvinyl alcohols, modified polyvinyl alcohols, acrylamide/(meth)acrylate copolymers and/or acrylamide/acrylate/methacrylate terpolymers can therefore be used as additional binders. This leads to coatings based on a water-soluble binder.

Conversely, there are also binders which are used as an aqueous dispersion. These are for example latices such as polymethacrylate ester, styrene acrylate ester copolymers, styrene/butadiene copolymers, polyurethanes, acrylate/butadiene copolymers, polyvinyl acetates and/or acrylonitrile butadiene copolymers and the like. A person skilled in the art would consider which binder or binder mixture would be particularly suitable in each individual case.

It is however preferable for the additional binder to be selected from the group consisting of styrene-butadiene latices and styrene-acrylate latices, since these have rheological and/or financial advantages.

If an additional binder is used, it is preferable for the crosslinked biopolymer material in the form of nanoparticles to be present in an amount of from 2 to 99 wt. %, preferably in an amount of from 10 to 80 wt. %, and particular preferably in an amount of from 40 to 60 wt. %, based on the overall weight of the binders. Too low amounts reduce the gain to be achieved in relation to the carbon copying performance, whereas too high amounts improve this performance but do not lead to the optimum result.

The selection of the developer is not critical. However, it is preferable for the developer to be selected from the group consisting of acidic clay materials, such as acid-activated bentonite or synthetic sodium aluminosilicate, zinc-doped phenolic resins, zinc salts of alkyl-arylated, preferably styrenated salicylic acid derivatives or mixtures thereof. Acidic clay minerals are described for example in U.S. Pat. No. 2,730,456 A, zinc-doped phenolic resins are described in DE 1 275 550 B, DE 2 228 431 A1, U.S. Pat. No. 3,737,410 A, DE 2 854 318 A1 and in GB 2 028 888 A, and zinc salts of alkyl-arylated, preferably styrenated salicylic acid derivatives (simply referred to as zinc salicylate derivatives) are described in DE 2 147 585 A1, U.S. Pat. No. 3,924,027 A, EP 0 470 516 A2 and in EP 0657300 A1. The use of organic developers, for example alkyl-arylated zinc salts, preferably styrenated salicylic acid derivatives, and of zinc-doped phenolic resins is preferable. These organic developing agents are advantageous over mineral developing agents in that they lead to low printing plate abrasion and have a low tendency to dust since the components are bound more effectively.

The at least one developer is used in the CF paper according to the invention preferably in an amount of from approximately 1 to 30 wt. %, preferably in an amount of from approximately 2 to 20 wt. %, and most preferably in an amount of from approximately 4 to 12 wt. %, based on the overall weight of the coating.

The selection of the coating pigment is not critical either. Aluminium silicates, such as kaolin/clay, magnesium silicates, calcium carbonates such as ground calcium carbonate or precipitated calcium carbonate, calcium aluminium sulfates such as satin white, barium sulfates, sodium sulfates such as gypsum, titanium dioxide and synthetic pigments such as polystyrene and talc can be used for example. The use of ground and/or precipitated calcium carbonate (GCC and/or PCC) is particularly preferable on account of the writing performance to be achieved thereby and for financial reasons.

The at least one coating pigment is used in the CF paper according to the invention preferably in an amount of from approximately 50 to 90 wt. %, particularly preferably in an amount of from approximately 60 to 85 wt. % and most preferably in an amount of from approximately 65 to 80 wt. %, based on the overall weight of the coating.

Within the context of the present invention, common additives are understood to mean dispersing agents, defoaming agents, crosslinking agents, rheology-controlling agents, antioxidants, UV stabilisers, optical brighteners, lubricants, surfactants and/or dyes. These are preferably present in an amount of from approximately 0.5 to 5 wt. %, particularly preferably in an amount of from approximately 1 to 4 wt. %, and most preferably in an amount of from approximately 1.5 to 3 wt. %.

In the case according to the invention, the coating that contains the crosslinked biopolymer material in the form of nanoparticles and is applied to the base paper leads to a weight of the applied layer (dry weight) of from 1 to 6 g/m$^2$, preferably from 2 to 5 g/m$^2$, and particularly preferably from 3 to 4.5 g/m$^2$.

The selection of the base paper is not critical either. However, it is preferable for the base paper to be based on cellulose fibres, a synthetic paper carrier of which the fibres consist in particular either completely or in part of plastics fibres. The base paper is used in a basis weight of from approximately 40 to 180 g/$m^2$, in particular from approximately 50 to 100 g/$m^2$.

In a preferred embodiment, the CF paper according to the invention is a CF paper that comprises a base paper and a coating applied thereto, the coating containing a crosslinked biopolymer material in the form of nanoparticles as the binder, a styrene-butadiene latex and/or a styrene-acrylate latex as the additional binder, a developer which is preferably zinc salts of styrenated salicylic acid derivatives and/or zinc-doped phenolic resins, calcium carbonate as the coating pigment, and common additives.

In said special CF paper, it is likewise preferable for the crosslinked biopolymer material in the form of nanoparticles to be present in an amount of from approximately 2 to 99 wt. %, and particularly preferably in an amount of from 40 to 60 wt. %, based on the overall weight of the binders.

In another preferred embodiment, the CF paper according to the invention is a CF paper that comprises a base paper and a coating applied thereto, the coating containing a crosslinked biopolymer material in the form of nanoparticles in an amount of from approximately 5 to 15 wt. % as the binder, a styrene-butadiene latex in an amount of from 1 to 15 wt. % as the additional binder, zinc salts of styrenated salicylic acid derivatives or zinc-doped phenolic resins in an amount of from 5 to 20 wt. % as the developer, precipitated calcium carbonate in an amount of from 50 to 80 wt. % and ground calcium carbonate in an amount of from 0 to 20 wt. %, preferably in an amount of from 10 to 20 wt. %, as the coating pigment, and common additives in an amount of from approximately 1 to 3 wt. %, based on the overall weight of the coating in each case.

The present invention also relates to the use of the above-described CF paper as a carbonless copy paper. This can be used in particular in combination with a CB paper. The use of the CF paper coating according to the invention in a CFB paper is also possible.

The invention also relates to the use of the above-described CF paper in an offset printing method. Offset printing methods are understood to mean offset printing methods using conventional printing inks (absorption drying) and UV-curing offset printing methods (i.e. using UV-curing printing inks and UV-direct drying according to each printing unit). The use of the CF paper according to the invention in UV-curing offset printing methods is particularly preferable.

As mentioned at the outset, the CF paper according to the invention, which contains the developer, inter alia, in the coating) is used together with an additional paper. This additional paper preferably contains microcapsules which contain a colour forming substance stored in a binder. A person skilled in the art is able to select suitable colour formers. Colour formers in the form of 2-anilino-3-methyl-6-diethyl-amino-fluoran, 2-anilino-3-methyl-6-di-n-butylamino-fluoran, 2-anilino-3-methyl-6-(N-ethyl-, N-p-toluidino-amino)-fluoran, 2-anilino-3-methyl-6-(N-methyl-, N-propyl-amino)-fluoran, 2-anilino-3-methyl-6-(N-ethyl-, N-isopentyl-amino)-fluoran, 3,3-Bis-(4-dimethylamino-phenyl)-6-dimethyl-amino-phthalide 6-diethylamino-3-methyl-2-(2,4-dimethylphenyl)-amino-fluoran, 3-[Bis[4-(methylphenyl-amino)phenyl]methyl]-9-butyl-9H-carbazole, 2-[Bis(phenylmethyl) amino]-6-(diethylamino)-fluoran, 3,3-Bis(2-methyl-1-octyl-1H-indole-3-yl)-1(3H)-isobenzofuranone, 6-[ethyl(4-methylphenyl) amino]-2-methyl-fluoran and/or 6-diethylamino-2-ethoxycarbonyl-fluoran are preferably used.

The advantages associated with the present invention can essentially be summarised as follows:

The present invention leads to a CF paper that has very good carbon copying performance, without adversely affecting the printability, for example. By means of the CF paper according to the invention, it is also possible to keep the proportion of developer in the binder as low as possible. Furthermore, fully or partly replacing known binders, such as SB latex, with the crosslinked biopolymer material in the form of nanoparticles is advantageous from a financial point of view.

The invention will be described in detail hereinafter on the basis of non-restricted examples.

EXAMPLES

Example 1: Production and Evaluation of a CF Paper in Which 50% of the SB Latex has been Replaced with Ecosphere 2240 (Developer: Zinc Salicylate Derivative)

Homogeneous aqueous coating slips were prepared according to the dry formulations described in table 1, and uncoated base papers (basis weight 48 g/$m^2$) were coated using a laboratory coating machine from Koehler SE by means of blade application. Drying was carried out by means of an infrared radiator and hot air. The coating application was determined by means of differential weighing. Prior to evaluation, the temperature of the papers was controlled (22° C., 50% RH) and the additional functional tests were also tested under constant indoor climate conditions. An objective comparison of the carbon copying performance is only possible when the coating binding (test: dry picking) and the whiteness of the paper on which the carbon copy is generated have comparable values.

TABLE 1

| Formulation | | A | B |
|---|---|---|---|
| PCC (precipitated calcium carbonate) | [parts by weight] | 80 | 80 |
| GCC (ground calcium carbonate) | [parts by weight] | 20 | 20 |
| Zn salicylate derivative | [parts by weight] | 8.8 | 8.8 |
| SB latex | [parts by weight] | 25.24 | 12.62 |
| Ecosphere 2240 | [parts by weight] | | 12.62 |
| Other additives | [parts by weight] | 2.4 | 2.4 |
| Dry coating application | [g/$m^2$] | 4.2 | 4.0 |
| Carbon copying performance | [contrast %] | 28.0 | 33.5 |
| Whiteness R 457 | [%] | 91.0 | 90.6 |
| Dry picking | [m/s] | 2 | 1-2 |

The carbon copying performance was determined as follows: using an electric typewriter (Olympia common 200i, OCR-A.10 daisy wheel, symbol solid area) a defined 3×4 cm large carbon copying surface was generated on the CF paper to be tested (developer) by a CB paper-tested quality (colour former, black print) and at a defined penetration strength, and the blackening was measured as the reflection 30 s later using an ink measuring device (Elrepho SE070, illuminant D65). The contrast is given in % [(reflection $R_y$ of the unprinted region−reflection $R_y$ of the printed region)/reflection $R_y$ unprinted].

The whiteness of the papers was likewise determined using the ink measuring device Elrepho SE070. Plies of paper were placed one top of one another until the opacity of the stack reached 100% and the whiteness of the surface was then determined by measuring the reflection (illuminant R 457 D 65).

A common test in the paper industry is "dry picking", which is used as a measure of the coating binding and thus as a measure of the offset printability. This test was carried out using the printability testing unit "Prüfbau MZ II" from Prüfbau Dr.-Ing. H. Dürner GmbH. A specific amount of a standardised printing ink was printed, by means of a rubber roller, on a strip of defined dimensions of the paper to be tested in accordance with a specific procedure. If this process were carried out at different speeds, there would be an increased number of flaws in the printed image as a result of paper fibres of pigments tearing out. The maximum printing speed [m/s] in which an error-free printed image is still provided is stated as the value for the "dry picking".

This example shows that the use of a coating having formulation B (50% of the SB latex replaced with Ecosphere 2240) leads to a clear improvement in the carbon copying performance compared with the use of a coating having formulation A (100% SB latex).

Example 2: Production and Evaluation of a CF Paper in Which 50% of the SB Latex has been Replaced with Ecosphere 2240 (Developer: Zinc-Doped Phenolic Resin)

CF papers were produced in a similar way to in example 1. The corresponding dry formulations can be seen in table 2.

TABLE 2

| Formulation | | C | D |
|---|---|---|---|
| PCC (precipitated calcium carbonate) | [parts by weight] | 80 | 80 |
| GCC (ground calcium carbonate) | [parts by weight] | 20 | 20 |
| Zn-doped phenolic resin | [parts by weight] | 16.0 | 16.0 |
| SB latex | [parts by weight] | 25.24 | 12.62 |
| Ecosphere 2240 | [parts by weight] | | 12.62 |
| Other additives | [parts by weight] | 2.4 | 2.4 |
| Dry coating application | [g/m$^2$] | 4.0 | 4.3 |
| Carbon copying performance | [contrast %] | 25.3 | 32.5 |
| Whiteness R 457 | [%] | 89.1 | 89.0 |
| Dry picking | [m/s] | 1-2 | 2 |

The use of a coating having formulation D (50% of the SB latex replaced with Ecosphere 2240) led to a clear improvement in the carbon copying performance compared with the use of a coating according to formulation C (100% SB latex).

Example 3: Production and Evaluation of a CF Paper in Which 50% of the SB Latex has been Replaced with Various Starch-Based Binders (Developer: Zinc-Salicylate Derivative) and of a CF Paper Only Having Ecosphere 2240 as the Binder CF papers were produced in a similar way to in example 1. The dry formulations can be seen in table 3.

This example shows that replacing some of the SB latex with Ecosphere 2240 leads to a comparable or even slightly better carbon copying performance than replacing some of it with other soluble types of starch.

Ecosphere 2240 was replaced with two conventional starch-based soluble binders in what was otherwise the same coating ink formulation. Native potato starch was used as a 20% solution, which was produced by being heated and subsequently partially enzymatically decomposed by means of α-amylase. Sobex 222 is a cold water-soluble highly-substituted depolymerised starch that was used in powder form. In formulation I, SB latex was completely omitted and only Ecosphere 2240 was used as the binder. In comparison with formulation F (SB latex: Ecosphere 2240, 50:50), although a slightly lower carbon copying performance was found, this was still higher than the carbon copying performance of the standard (formulation E).

TABLE 3

| Formulation | | E | F | G | H | I |
|---|---|---|---|---|---|---|
| PCC (precipitated calcium carbonate) | [parts by weight] | 80 | 80 | 80 | 80 | 80 |
| GCC (ground calcium carbonate) | [parts by weight] | 20 | 20 | 20 | 20 | 20 |
| Zn salicylate derivative | [parts by weight] | 8.8 | 8.8 | 8.8 | 8.8 | 8.8 |
| SB latex | [parts by weight] | 25.2 | 12.6 | 12.6 | 12.6 | |
| Ecosphere 2240 | [parts by weight] | | 12.6 | | | 25.2 |
| Sobex 222 | [parts by weight] | | | 12.6 | | |
| Native potato starch | [parts by weight] | | | | 12.6 | |
| Other additives | [parts by weight] | 2.4 | 2.4 | 2.4 | 2.4 | 2.4 |
| Dry coating application | [g/m$^2$] | 4.0 | 4.0 | 4.0 | 4.0 | 4.0 |
| Carbon copying capacity | [contrast %] | 32.0 | 37.5 | 35.1 | 35.1 | 35.2 |
| Whiteness R 457 | [%] | 91.0 | 90.4 | 90.8 | 90.3 | 89.6 |
| Dry picking | [m/s] | 0.5-1 | 1 | 2 | 1-2 | 1-2 |

Example 4: Printability by Means of the CF Paper According to the Invention

In order to demonstrate that replacing 50% of the SB latex with Ecosphere 2240 does not adversely affect printability using UV offset printing inks, a pilot coating test was carried out in order to be able to provide the corresponding amount of paper.

The pilot coating test was carried out using coating inks analogous to those in example 3. Of the two different soluble starches tested in example 3, the cold water-soluble starch Sobex 222 was selected. The coating slips are applied by means of rollers and a flat blade in order to set the coating weight at a speed of 300 m/min.

The papers were printed in a printer by means of offset printing using rollers (7000 running metres) a) using conventional printing inks (absorption drying) and b) using UV-curing printing inks and UV-direct drying after each printing unit (four different inks in four printing units).

Conventional offset printing presented no problems and led to a good printed image in all cases.

In UV offset printing, the coating according to formulation G (soluble starch) led to a build-up of ink on the rubber blanket in two printing units during the printing process, which led to a disturbed print and poor printed image, while the paper having the coating according to formulation F could be printed on without any problems.

The dry formulations and the respective properties can be seen in table 4.

TABLE 4

| Formulation | | E | F | G |
|---|---|---|---|---|
| PCC (precipitated calcium carbonate) | [parts by weights] | 80 | 80 | 80 |
| GCC (ground calcium carbonate) | [parts by weight] | 20 | 20 | 20 |
| Zn salicylate derivative | [parts by weight] | 8.8 | 8.8 | 8.8 |
| Ecosphere pre-dispersion | [parts by weight] | | 12.6 | |
| Sobex 222 | [parts by weight] | | | 12.6 |
| SB latex | [parts by weight] | 25.2 | 12.6 | 12.6 |
| Other additives | [parts by weight] | 2.4 | 2.4 | 2.4 |
| Application | [g/m$^2$] | 1.8 | 1.7 | 2.8 |
| Carbon copying performance | [contrast %] | 25.9 | 28.2 | 29.1 |
| Dry picking | [m/s] | 3.5 | 3.5 | 3.5 |
| UV offset printing using 4 inks in 4 printing units | Ink build up after 7000 m | No | No | Evident in 2 printing units |
| Conventional offset printing | Overall evaluation | OK | OK | OK |

The invention claimed is:

1. CF paper comprising a base paper and a coating applied thereto, which coating contains at least one binder, at least one developer, at least one coating pigment and at least one additive selected from dispersion agents, defoaming agents, crosslinking agents, rheology controlling agents, antioxidants, UV stabilizers, optical brighteners, lubricants, surfactants, and dyes, wherein the at least one binder comprises a crosslinked biopolymer material in the form of nanoparticles, and wherein said paper contains the crosslinked biopolymer material in the form of nanoparticles in an amount of from 7 to 25 wt. %, based on the overall weight of the coating.

2. CF paper according to claim 1, characterised in that the crosslinked biopolymer material in the form of nanoparticles has a degree of swelling of less than 2.

3. CF paper according to claim 1, characterised in that the crosslinked biopolymer material in the form of nanoparticles is a starch, a starch derivative or a polymer mixture comprising at least 50 wt. % starch or starch derivative.

4. CF paper according to claim 1, characterised in that the crosslinked biopolymer material in the form of nanoparticles has an average particle size of between 10 nm and 1000 nm.

5. CF paper according to claim 1, characterised in that the coating contains an additional binder.

6. CF paper according to claim 5, characterised in that the additional binder is selected from the group consisting of native starches, modified starches, polyvinyl alcohol, styrene-butadiene latices (SB latices), and styrene-acrylate latices (SA latices).

7. CF paper according to claim 6, characterised in that the additional binder is a styrene-butadiene latex and/or a styrene-acrylate latex.

8. CF paper according to claim 5, characterised in that the crosslinked biopolymer material in the form of nanoparticles comprises from 2 to 99 wt. %, of the overall weight of the binders.

9. CF paper according to claim 1, characterised in that the developer is selected from the group consisting of zinc-doped phenolic resins and zinc salts of alkyl-arylated, salicylic acid derivatives or mixtures thereof.

10. CF paper according to claim 1, characterised in that the coating contains a styrene-butadiene latex and/or a styrene-acrylate latex as the additional binder, zinc salts of styrenated salicylic acid derivatives or zinc-doped phenolic resins as the developer, $CaCO_3$ as the coating pigment, and at least one additive selected from dispersion agents, defoaming agents, crosslinking agents, rheology controlling agents, antioxidants, UV stabilizers, optical brighteners, lubricants, surfactants, and dyes.

11. CF paper according to claim 10, characterised in that the crosslinked biopolymer material in the form of nanoparticles comprises from 2 to 99 wt. %, of the overall weight of the binders.

12. A carbonless copy paper comprising the CF paper according to claim 1 in combination with a CB paper, or in a CFB paper.

13. A method of printing comprising UV-curing offset printing on the CF paper according to claim 1.

14. CF paper according to claim 1, characterised in that the crosslinked biopolymer material in the form of nanoparticles has a degree of swelling less than 1.

15. CF paper according to claim 1, characterised in that the crosslinked biopolymer material in the form of nanoparticles has an average particle size of between 40 nm and 200 nm.

16. CF paper according to claim 1, characterised in that said paper contains the crosslinked biopolymer material in the form of nanoparticles in an amount from 15 to 22 wt. % based on the overall weight of the coating.

17. CF paper according to claim 8, characterised in that the crosslinked biopolymer material in the form of nanoparticles comprises from 40 to 60 wt. % of the binders.

18. CF paper according to claim 3 wherein said nonparticle is starch.

19. CF paper according to claim 9, characterised in that said developer is styrenated.

20. CF paper according to claim 1, characterized that the coating contains an additional binder comprised of styrene-butadiene latex.

* * * * *